US010062952B2

(12) United States Patent
Dai et al.

(10) Patent No.: US 10,062,952 B2
(45) Date of Patent: *Aug. 28, 2018

(54) HEATABLE WINDOW WITH A HIGH-PASS FREQUENCY SELECTIVE SURFACE

(71) Applicant: Pittsburgh Glass Works, LLC, Pittsburgh, PA (US)

(72) Inventors: David Dai, Novi, MI (US); Peter T. Dishart, Wexford, PA (US); Kaushal Mehta, Aspinwall, PA (US)

(73) Assignee: Pittsburgh Glass Works, LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/584,539

(22) Filed: May 2, 2017

(65) Prior Publication Data

US 2017/0250456 A1    Aug. 31, 2017

Related U.S. Application Data

(62) Division of application No. 14/177,790, filed on Feb. 11, 2014, now Pat. No. 9,673,534.

(51) Int. Cl.
| | | |
|---|---|---|
| *B60L 1/02* | (2006.01) | |
| *H01Q 1/12* | (2006.01) | |
| *H01Q 15/00* | (2006.01) | |
| *H05B 3/00* | (2006.01) | |
| *H05B 3/84* | (2006.01) | |

(52) U.S. Cl.
CPC ....... *H01Q 1/1278* (2013.01); *H01Q 15/0013* (2013.01); *H05B 3/0042* (2013.01); *H05B 3/84* (2013.01); *H05B 2203/011* (2013.01); *H05B 2203/013* (2013.01)

(58) Field of Classification Search
CPC .... H01Q 1/1278; H01Q 15/0013; H05B 3/84; H05B 3/0042; H05B 2203/011; H05B 2203/013
See application file for complete search history.

(56) References Cited

U.S. PATENT DOCUMENTS

| | | |
|---|---|---|
| 3,655,545 A | 4/1972 | Gillery et al. |
| 3,962,488 A | 6/1976 | Gillery |
| 4,898,789 A | 2/1990 | Finley |
| 5,867,129 A | 2/1999 | Sauer |
| 6,356,236 B1 | 3/2002 | Maeuser |
| 6,730,389 B2 | 5/2004 | Voeltzl |
| 6,860,081 B2 | 3/2005 | Walton et al. |
| 7,190,326 B2 | 3/2007 | Voetzel |
| 8,022,333 B2 | 9/2011 | Maeuser |
| 9,673,534 B2 * | 6/2017 | Dai ............. H01Q 15/0013 |

* cited by examiner

*Primary Examiner* — Shawntina Fuqua
(74) *Attorney, Agent, or Firm* — Cohen & Grigsby, P.C.

(57) ABSTRACT

An electrically conductive coating of an automotive heatable windshield having a frequency selective surface area that facilitates the transmission of radio frequency signals. The FSS area may be a high-pass filter such that RF signals at any polarization can pass through the glazing over a wide frequency band. The FSS area is defined by a pattern in the conductive coating such that, when the conductive coating is used to heat the windshield, electrical current flows through the FSS area to mitigate hot and cold spots.

9 Claims, 9 Drawing Sheets

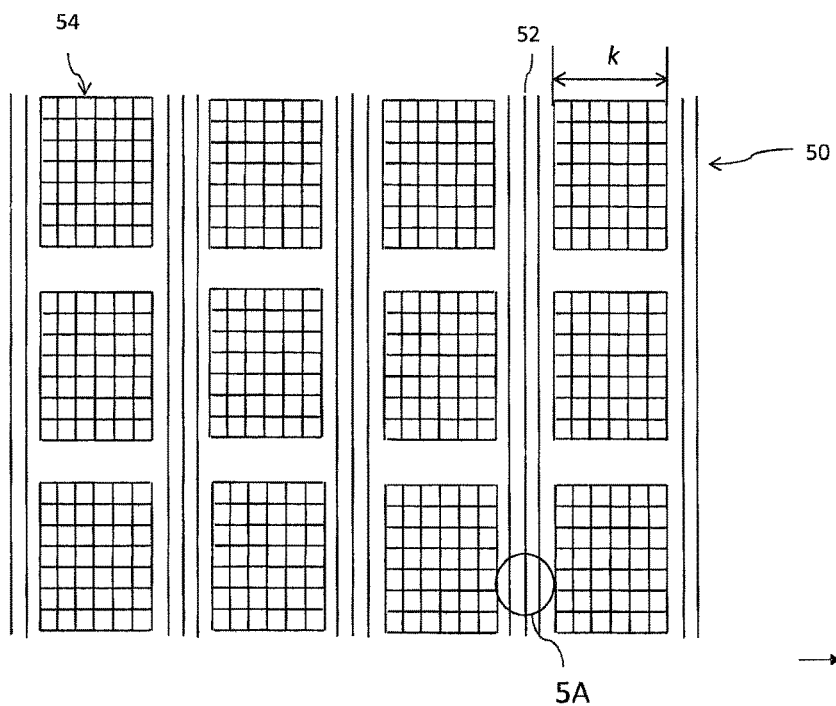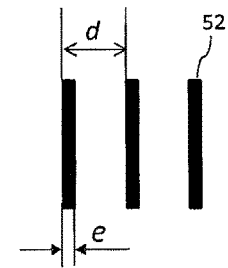
FIG. 5  FIG. 5A

HEATABLE WINDOW WITH A HIGH-PASS FREQUENCY SELECTIVE SURFACE

TECHNICAL FIELD

The presently disclosed invention relates to a transparency having a conductive coating that includes frequency selective surface (FSS) that passes radio frequency (RF) signals in one or more frequency bands. More particularly, the presently disclosed invention relates to an automotive windshield in which a portion of an electrically heatable coating defines an FSS that supports radio frequency signal communication through the windshield while mitigating thermal extremes and optical distortion in the region of the windshield in and adjacent to the FSS.

BACKGROUND OF THE INVENTION

Windows are sometimes coated with transparent metallic coatings that can be used to electrically heat the window. By applying a DC voltage to the metallic coating, electric current is caused to flow through the coating and across the surface of the window thereby heating the window. Such embodiments are typically used to defrost or defog the window.

One of the consequences of using metallic coated windows is that they can attenuate the propagation of RF signals through the window. As a result, wireless communication into and out of buildings, vehicles, and other structures that use metallic coated windows to defrost or defog the window can be restricted. One solution for applications in which the metallic coating interferes with the propagation of signals through the window has been to remove a portion of the metallic coating that interferes with the signals. Removal of the coating facilitates the transmission of RF signals through the portion of the window where the coating is removed. However, removal of the metallic coating also negates heating of the uncoated area allowing ice and snow to accumulate and remain on the uncoated region. In addition, it has been found that such uncoated areas resulted in localized high current or low current regions that create hot spots and cold spots in and around the uncoated area. Such thermal disparities result in difficulties with defrosting and deicing capabilities and also can cause localized curvatures of the glass that results in optical distortions.

One manner of addressing such problems and limitations related to metallic coatings has been to create a frequency selective surface ("FSS") area in the coating. A FSS is a periodic pattern in the heatable coating having either one or two dimensions (i.e. single or double periodic structures) that acts as a filter for one or more bandwidths. Depending on the physical construction, materials and geometry of such structures, they are categorized as low-pass, high-pass, band-pass and band-stop filters. For example, as applied to automobile windshields, the FSS acts as a band-pass filter for RF communication signals.

Several FSS designs have been proposed for which laser deletion is used to remove portions of the metallic coatings and generate an FSS area in the coatings that allows RF signals to pass through with limited attenuation. U.S. Pat. No. 6,356,236 B1 to Maeuser illustrates a low loss 1.5 mm FSS grid pattern with line width of 0.3 mm. This FSS grid can be used for an electronic toll collection (ETC) system that is operated at 5.8 GHz. However, the FSS grid pattern creates a break in the electrical current path that blocks even heating across the window. Therefore, such a grid pattern is not preferred for a heatable windshield application. U.S. Pat. No. 5,867,129 to Sauer discloses FSS patterns that incorporate vertical slots or cross-shaped slots with a length that is appropriately tuned for 5.8 GHz applications. However, those designs have not met performance requirements due to high losses.

For heated window applications, U.S. Pat. No. 6,860,081 B2 to Walton and U.S. Pat. No. 7,190,326 B2 to Voeltzel illustrate a variety of different vertical FSS patterns that allow DC current to pass through the FSS window for heating purposes. The slots are oriented vertically so that only horizontally polarized signals can pass the FSS window with low loss. Vehicle electronics of different applications operate at various frequency bands. Such electronics require good RF transmittance in all applicable bands and for all applicable polarizations, including vertical and circular polarizations as well as horizontal polarizations. The designs described above fail to adequately meet those requirements. U.S. Pat. No. 8,022,333 B2 to Maeuser discloses an FSS design on the third visor area of a windshield with low loss conductive material to improve performance. That design requires cover by black paint so the only feasible location for the electronic device is the third visor area of the windshield. Because rain sensor, IR camera, and night vision camera devices already are normally located on the third visor area, space limitations and possible EMC issues make the addition of still more devices in that area somewhat impracticable.

As the demand for vehicle electronics continues to rapidly grow, an increasing number of antennas also have been integrated in the vehicle. For instance, AM/FM radios, TV, cellular phone, remote keyless entry, global positioning system, electronic toll collection, and radar systems are all included in many vehicles. Accordingly, there was a need in the prior art for a metallic coated window having an FSS that would permit the transmission of RF signals. Furthermore, there also was a need for facilitating RF transmission through a window while still enabling electric current flow across the panel in a manner that does not create localized hot spots and cold spots around the perimeter of the FSS area.

SUMMARY OF THE INVENTION

In accordance with the presently disclosed invention, transparent windows with a thin conductive coating have at least one frequency selective surface that facilitates radio frequency transmission. The disclosed frequency selective surface can be used with heatable coatings while avoiding the drawbacks of the frequency selective surface designs known in the prior art. The frequency selective surface of the presently disclosed invention passes RF signals over at least one frequency band and at different polarizations with limited attenuation. The disclosed windows can be applied to any suitable application including, but not limited to, vehicles, buildings, or other structures in which windows are used.

Metallic coatings that are applied to a window act as a filter that blocks electromagnetic signals in the RF and infrared regions that are outside that part of the electromagnetic spectrum that is visible to humans. When voltage is applied to move electric current through the coating, electrical resistance of the coating generates heat and causes the coating to function as a heatable coating for de-icing or defogging. When no electrical current flows in the coating, the coating functions as a solar control coating that reflects IR energy. A portion of the metallic coating defines an area with a frequency selective surface ("FSS"). Within the FSS area, radio frequency signals within at least one frequency band can pass through the metal layer with little or no attenuation. The pattern of the FSS is defined by deletion lines in a portion of the conductive coating. The conductive coating is removed according to the pattern of the deletion lines. The deletion lines are arranged in a pattern of slots that pass signals having at least one predetermined wavelength of the electromagnetic spectrum. The FSS area is sometimes referred to as a communication window.

In one embodiment of the presently disclosed invention, the communication window or FSS area includes a frequency selective surface that has a plurality of vertical slots that are oriented parallel to each other within the perimeter of the communication window. For the RF signal to resonate in the slots, the length of the vertical slots are at least one-half of the signal wavelength that corresponds to signals having the lowest frequencies within the bandwidth that are to pass through the window. Between the vertical slots, one or more sets of horizontal slots of predetermined length cross corresponding sets of vertical slots within the length of the vertical slots within the set. The area of the metallic coating in which a set of vertical slots crosses a set of horizontal slots, is referred to herein as a patch array. Each vertical slot within a group of vertical slots is separated by a predetermined distance such that electrical current can flow along the undeleted vertical coating strips between adjacent vertical slots for purposes of heating the underlying substrate within the perimeter of the FSS. The pattern of vertical slots repeats throughout the communication window so that the frequency selective area forms a periodic pattern of groups of vertical slots that are separated by patch arrays.

In another embodiment of the invention, arrays of patches or elements are defined in vertical and horizontal slots in the coating of predetermined sub-areas of the FSS. The patch arrays are spaced from each other by strips of undeleted coating and form a periodic structure within the perimeter of the communication window. The width and length of the patch array is selected to pass RF signals within a designated frequency band. The strips of undeleted coating enable electrical current flow across the FSS area to heat the communication window when the window is equipped with de-icing or defogger functions.

Slots that are vertically oriented facilitate horizontally polarized RF signals while the slots that are horizontally oriented facilitate vertically polarized signals. For patch arrays that incorporate both vertical and horizontal slots, RF signals at any polarization can pass through the communication window, including vertical, horizontal, and circular polarized signals at predetermined frequencies.

In one embodiment of the FSS, the respective lengths of vertical and horizontal slots, orientation of each element, and space between the elements are selected to facilitate RF transmission of both linear polarized signals operated at 2.5 GHz and circularly polarized signals operated at 5.8 GHz for automotive electronic toll collection (ETC) applications. The same design principle is applicable to a frequency selective surface to facilitate RF transmission of electronics operated at other frequency bands and at other polarizations.

BRIEF DESCRIPTION OF THE DRAWINGS

For a more complete understanding of the disclosed invention, reference should now be had to the embodiments illustrated in greater detail in the accompanying drawings and described below by way of examples of the invention. In the drawings:

FIG. 5 is a schematic view of part of a frequency selective surface according to a third embodiment incorporating features of the presently disclosed invention.

FIG. 5A is an enlarged part of the inset portion of FIG. 5 that is included in the circle 5A of FIG. 5.

DETAILED DESCRIPTION OF THE INVENTION

Figure 1:
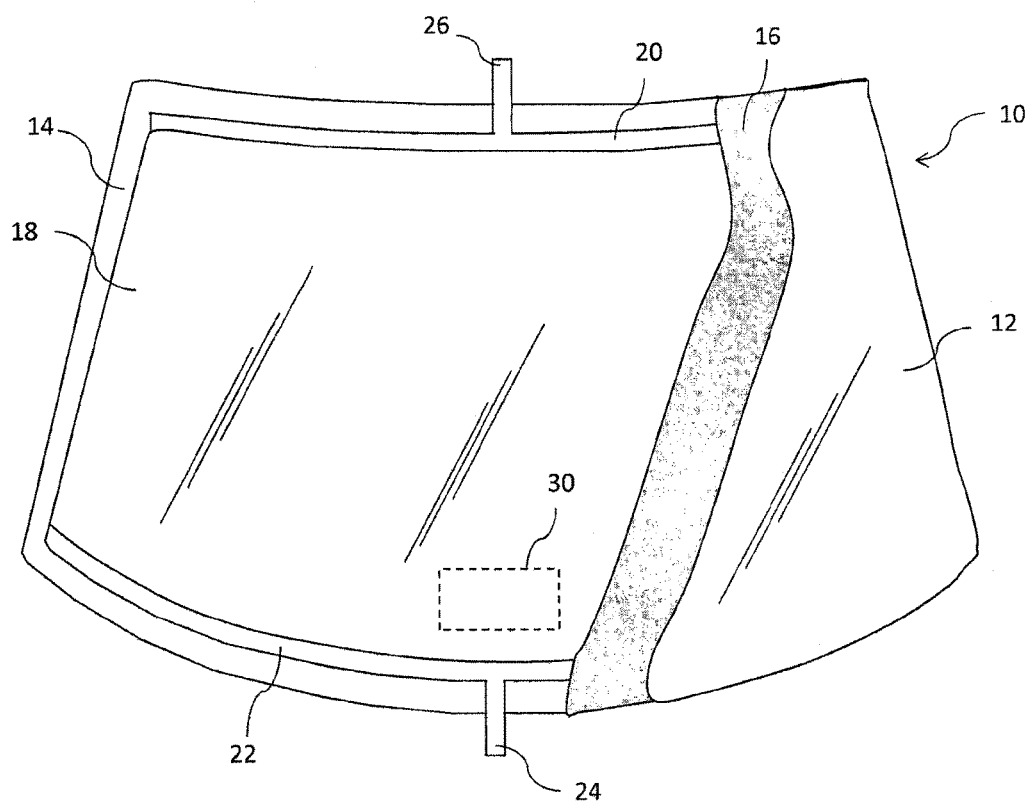
FIG. 1 is a plan view of an automotive windshield incorporating features of the presently disclosed invention.

FIG. 1 shows a plan view of a transparent windshield 10 that incorporates features of the presently disclosed invention. Windshield 10 is a laminated vehicle windshield formed of outer and inner glass plies 14 and 12 that are bonded together by an interposed layer 16. Preferably, layer 16 is a standard polyvinylbutyral, polyvinyl chloride, polyurethane or similar plastic material that has oppositely disposed surfaces that are defined by an edge between those surfaces. Outer glass ply 14 has an outer surface (conventionally referred to as the number 1 surface) on the outside of the vehicle and an inner surface that is oppositely disposed from the outer surface and that faces one surface of layer 16 (conventionally referred to as the number 2 surface). Inner glass ply 12 has an outer surface (conventionally referred to as the number 3 surface) that faces the surface of layer 16 that is oppositely disposed from the surface that faces outer glass ply 14. Inner glass ply 12 also has an inner surface that is oppositely disposed from the outer surface of inner glass ply 12 (conventionally referred to as the number 4 surface). The interlayer 16 is between surfaces No. 2 and 3 of glass plies 14 and 12.

Windshield 10 further includes an electro-conductive coating or element 18 which occupies the daylight opening of the transparency. The conductive coating is incorporated into automotive window glass for use as solar shield to reduce the transmission or passage of infrared and ultraviolet radiation through the window. Coating element 18 is preferably a transparent electro-conductive coating that is applied to the number 2 surface of the outer glass ply 14 (as shown in FIG. 1) or on number 3 surface of the inner glass ply 12, as is well known to those skilled in the art. Coating 18 may have single or multiple metal-containing layers as, for example, disclosed in U.S. Pat. No. 3,655,545 to Gillery et al.; U.S. Pat. No. 3,962,488 to Gillery and U.S. Pat. No. 4,898,789 to Finley. The conductive coatings have a sheet resistance of about 2.7Ω/□ for an optical transmission of about 75%.

Windshield 10 further includes a top bus bar 20 and bottom bus bar 22. Top bus bar 20 and bottom bus bar 22 are both mounted on the same surface as coating 18 and are electrically connected to coating 18. Bus bar 22 is also electrically connected to an external power source (not shown) by a lead 24. Bus bar 20 is electrically connected to a common or ground line 26. Electrical current flows through metallic coating 18 in response to voltage applied between bus bars 22 and 20 to heat the windshield. In other embodiments, more than two bus bars could be used to more precisely control current flow through the electrically conductor coating and consequently the heating pattern of the electrically conductive coating.

Conductive coating 18 further includes a frequency selective surface area ("FSS area") that defines an aperture or communication window 30 that incorporates features of the presently disclosed invention. The FSS area facilitates the transmission of RF signals through metallic coating 18. The position of FSS area 30 is illustrated in FIG. 1 by dotted line. The dotted line indicates that the frequency selective surface within the communication window is electrically connected to coating 18.

Figure 2:
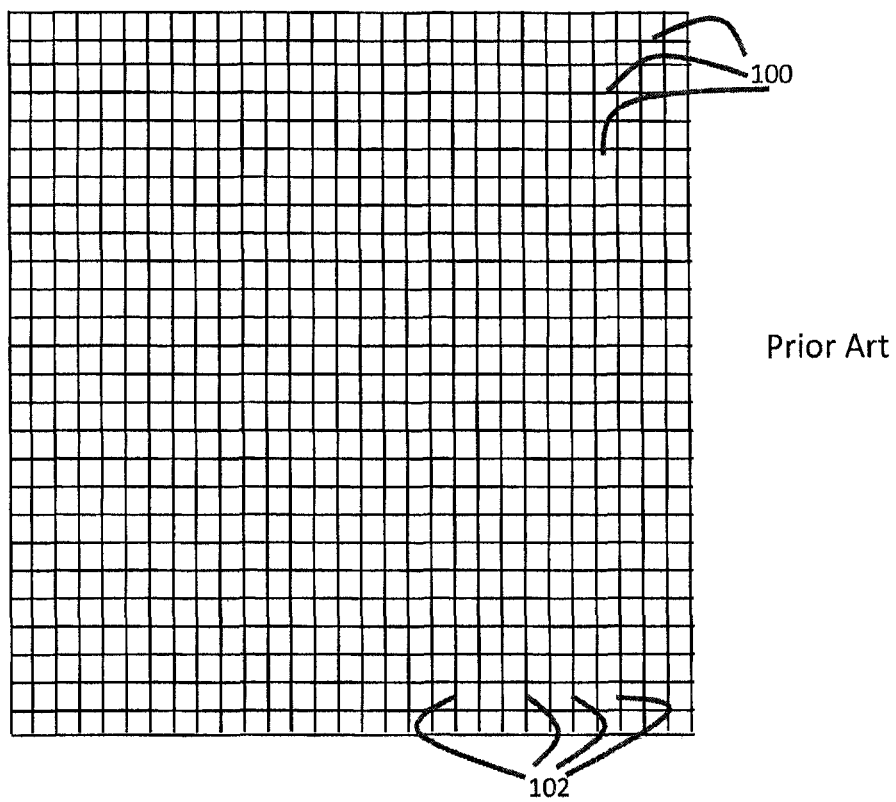
FIG. 2 is a schematic view of a frequency selective surface known in the prior art.

FIG. 2 illustrates details of an FSS area known in the prior art. As shown in FIG. 2, a set of horizontal slots 100 are arranged orthogonally with respect to a set of vertical slots 102. Each of the vertical and horizontal slots are an area in which the conductive coating 18 has been removed. When a voltage is applied between bus bars 20 and 22, an electrical current is caused to flow generally through coating 18 to heat windshield 10. However, the pattern of prior art FSS areas prevents current from flowing through the FSS area and redirects current flow in significant areas of windshield 10. Such redirected current flow causes thermal extremes in various areas of windshield 10. For example, in FFS area 30 and in portions of windshield 10 directly above FSS area 30, window 10 remains relatively cold. In other areas, particularly at the upper corners of FSS area 30, the diverted current is particularly high creating areas that are relatively hot. Furthermore, the sharp deviation in temperature of windshield 10 (for example, at and around the upper corners of FSS area 30) cause local deviation in the curvature of the surface of windshield 10. Such deviations result in optical distortions of images viewed through those portions of the windshield 10. This is particularly troublesome considering the location of FSS area 30 and typical lines-of-sight through windshield 10.

Embodiments of the frequency selective surface area that are in accordance with the presently disclosed invention are more specifically shown in FIGS. 3, 4, 5 and 6 which are further explained below.

The FSS area in those embodiments can be generally described as including at least one element that has a first set of slots that are parallel to each other and a second set of slots that are parallel to each other and that are orthogonal to the slots of said first set of slots. Each of said slots is a strip of predetermined width and predetermined length that is void of conductive coating 18. Communication window 30 shown in FIG. 1 is located in the bottom center of the windshield. However, the location of communication window is not limited to that position. Communication window 30 can be positioned at any location on the windshield. Although only one communication window 30 is shown in the embodiment of the invention of FIG. 1, more than one communication window 30 can be provided in coating 18. The number of communication windows depends on the number and types of devices that are served by signals within the electromagnetic spectrum that must pass through the windshield.

Figures 3, 3A:
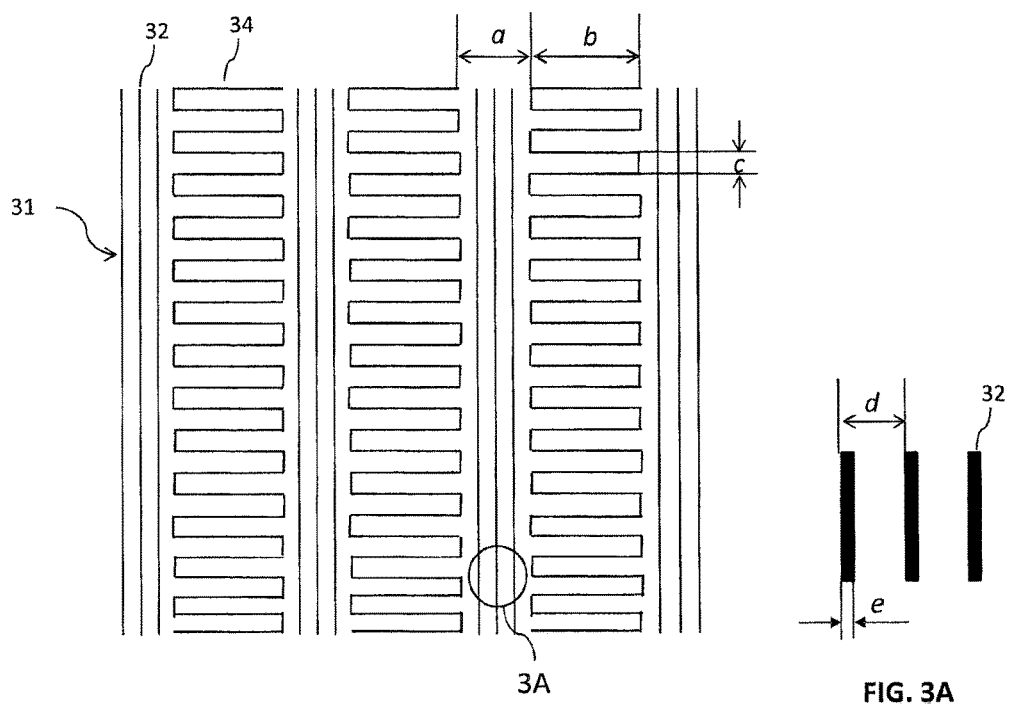
FIG. 3 is a schematic view of part of a frequency selective surface according to a first embodiment incorporating features of the presently disclosed invention.
FIG. 3A is an enlarged part of the inset portion of FIG. 3 that is included in the circle 3A of FIG. 3.

FIG. 3 illustrates an embodiment of communication window 30 having an FSS pattern 31 in accordance with the presently disclosed invention. Pattern 31 is comprised of vertical channels 32 and vertically oriented square-wave slots 34. Square-wave slots 34 are comprised of a first set of horizontal slots and a second set of vertical slots. Vertical channels 32 and square-wave slots 34 are features wherein the conductive coating 18 is absent such as removal by laser deletion. Vertical channels 32 can be described as two or more vertical channels that are parallel to each other and parallel to the slots of said second set of slots of said square-wave slots. Each of said vertical channels 32 has a predetermined width and a length that is equivalent to the height of the area of the frequency selective surface 30. Vertically oriented portions of square-wave slots 34 can be further described as members of the second set of slots each having first and second ends with the second set of slots arranged in two columns. Members of the second set of slots in one column connect the respective first ends of adjacent members of the first set of slots. Members of the second set of slots in the second column connect the respective second ends of adjacent members of the first set of slots. Vertical channels 32 and square-wave slots 34 are nested together in a pattern of alternating members of a linear (horizontal) array (also called a lateral array) with square-wave slots 34 interposed between groups of vertical channels 32. The pattern is repeated over the entire area of communication window 30.

FIG. 3A is an enlarged drawing that shows the detail of the vertical channels 32 in inset 3A of FIG. 3. Vertical channels 32 are approximately parallel to each other with d being the dimension at which adjacent vertical channels 32 horizontally repeat being in the range of 0.5 to 5 mm, and preferably in the range of 0.7 to 3 mm. The slot width e shows the width of metallic coating 18 that is removed to generate the channel 32. Slot width e is preferably in the range of 0.05 mm to 0.2 mm. The length of the horizontal leg of square-wave slot 34 is indicated as b. The length of the horizontal slot can be adjusted to facilitate the passage of vertically polarized signals, with signals of about one-half wavelength of the lowest passing frequencies being preferred. The spacing a between consecutive members of square-wave slots 34 is adjusted to facilitate the passage of horizontally polarized signals. The larger the dimension a, the more vertical channels 32 can be accommodated between square-wave slots 34 and, as a result, the more horizontally polarized signals can pass the FSS window. Dimensions a, b, e, d, and the length of vertical slot c of square-wave slot 34 are adjusted to vary the characteristics of the FSS filter to meet the requirements of the supported communication device. The conductive coating between vertically oriented channels 32 conducts electrical current between adjacent channels 32 and between adjacent square-wave slots 34 of the pattern 31 in the direction from bottom bus bar 22 to top bus bar 20 to heat the window glass within the FSS area 30.

Figures 4, 4A:
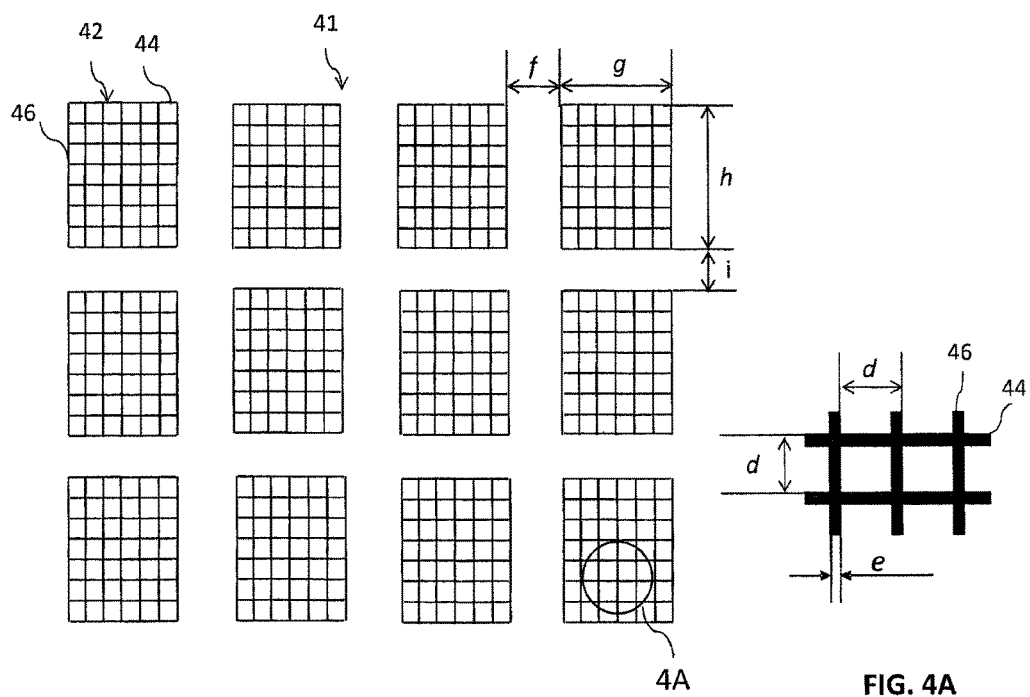
FIG. 4 is a schematic view of part of a frequency selective surface according to a second embodiment incorporating features of the presently disclosed invention.
FIG. 4A is an enlarged part of the inset portion of FIG. 4 that is included in the circle 4A of FIG. 4.

FIG. 4 illustrates another embodiment of an FSS pattern 41 in accordance with the disclosed invention. Pattern 41 is a periodic structure that is a regular grid pattern of basic element 42. Element 42 is a patch or two-dimensional array of slots. A set of vertical slots 46 each having length h is orthogonally oriented with respect to a set of horizontal slots 44 each having length g. As shown more particularly in FIG. 4A, the dimension at which adjacent horizontal and adjacent vertical slots repeat is d and the width of each slot is e. The length g of horizontal slots 44 corresponds to approximately one-half the wavelength for vertically polarized signals with the lowest passing frequency. The length h of vertical slots 46 corresponds to approximately one-half the wavelength of horizontally polarized signals with the lowest passing frequency. In this way, dimensions g and h primarily determine the resonant frequency band of the FSS filter. The spacings f and i are the respective horizontal and vertical dimensions between adjacent elements 42. Dimensions f and i, together with d and e are adjusted to tune the FSS filter in-band response to RF transmission within a designated frequency band. In addition, the strips of coating 18 between each element 42 support electrical current flow to provide heating to portions of glass within the FSS aperture when the windshield is equipped with current flow between bus bars 20 and 22 for heating functions.

FIG. 5 illustrates an example of another FSS pattern 50 in accordance with the presently disclosed invention. The FSS structure of pattern 50 is similar to the FSS structure of pattern 41 shown in FIG. 4 except that groups of vertical channels 52 are added between elements 54 of the two-dimensional patch array 50 to improve the passage of horizontally polarized RF signals. Another difference in FSS pattern 50 is that the dimension k, which is the length of horizontal slots in the two-dimensional array of elements or patches, is increased to improve the passage of vertically polarized RF signals at a lower frequency band. As shown in FIG. 5A, d is the horizontal dimension at which the vertical channels 52 repeat and width of each slot is e. Since vertical channels 52 are oriented in the direction of current flow between two bus bars located at the top and bottom of the windshield, channels 52 improve the heating function of FSS pattern 50 as compared to FSS pattern 41.

Figure 6:
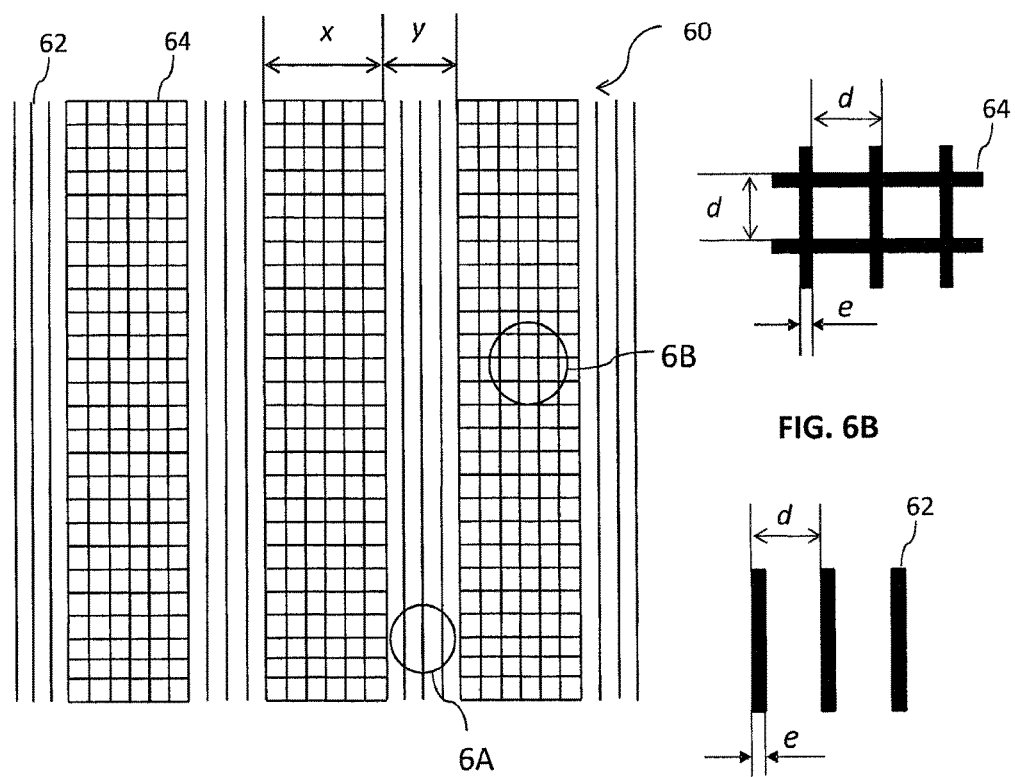
FIG. 6 is a schematic view of part of a frequency selective surface according to a further embodiment incorporating features of the presently disclosed invention.
Figure 6B:
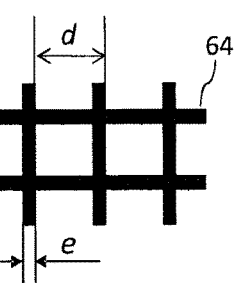
FIG. 6B is an enlarged part of the inset portion of FIG. 6 that is included in the circle 6B of FIG. 6.
Figure 6A:
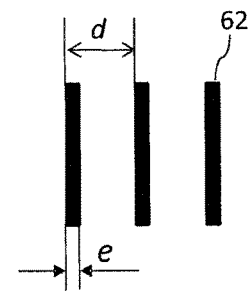
FIG. 6A is an enlarged part of the inset portion of FIG. 6 that is included in the circle 6A of FIG. 6.

FIG. 6 illustrates a further example of an FSS pattern 60 in accordance with the presently disclosed invention. FSS pattern 60 has a pattern of groups of vertical channels 62 and elements or patches 64. Elements or patches 64 are two-dimensional arrays of orthogonally oriented sets of slots that form a regular grid pattern. Groups of vertical channels 62 and patches 64 are arranged in a pattern of alternating members of a linear, horizontal array. In each array, patches 64 are interposed between groups of vertical channels 62. FSS pattern 60 repeats across the entire communication window 30. Adjacent members in each group of vertical channels 62 repeat in the horizontal dimension at the spacing d with e being the dimension of the width of the slots as shown in FIG. 6A which is an enlarged inset of FIG. 6. The patch arrays 64 have a width of x and the distance between adjacent patch arrays is y. The length x of the horizontal slots in patches 64 is selected according to the desired filter band. The length x is approximately one-half of the longest wavelength corresponding to lowest frequency of vertically polarized signals that communication window 30 is intended to pass. Dimension y is selected according to the performance requirements for the communication window 30 to pass vertically polarized RF signals. The smaller the dimension y, the more patches 64 (thus more horizontal sets of slots) can be accommodated in the communication window 30 and, as a result, more vertically polarized signals can pass the FSS window. In addition, groups of vertically oriented channels 62 between each patch array 64 channel electrical current flow on the coating between each channel in the group of vertical channels 62 across communication window 30 to heat the communication window when the windshield is equipped with heating facilities.

Without limiting the invention thereto, the following four examples further illustrate particular FSS patterns of the embodiments shown in FIGS. 3, 4, 5 and 6. An electrically-conductive coating of two silver films that are separated by dielectric film were sputter-deposited on a piece of clear float glass having a thickness of 2.1 millimeters (mm). A laser was used to form an FSS pattern in the coating. The coated and lased glass ply was then laminated with a second clear glass ply of the same thickness (2.1 mm) of the first ply using an interlayer having a thickness of 0.76 mm. The total thickness of the completed sample was in the range of 4.8 to 5.1 mm. The samples were tested for RF transmittance over a wide frequency range. Test results were recorded for both horizontal and vertical polarizations in the 2 GHz to 18 GHz frequency band for one sample and in the 2 GH to 8 GHz frequency band for the other three samples. All of the data illustrated in FIGS. 7 through 10 is normalized with respect to free space. The transmission loss included additional clear glass and interlayer losses without metallic coating which is about 2 to 3 dB as compared to free space.

Figure 7:
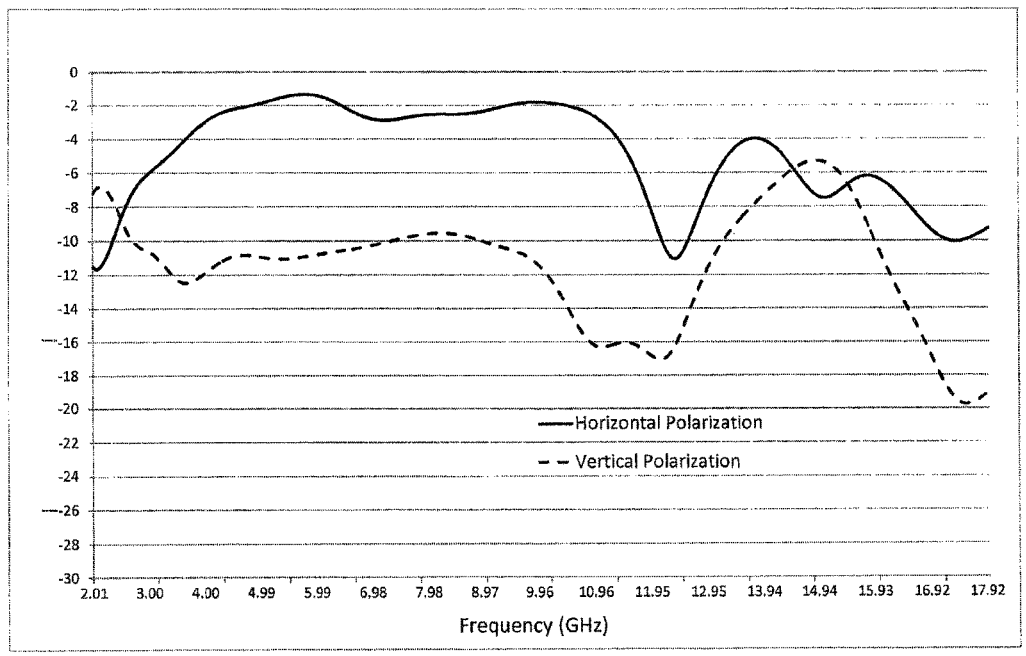
FIG. 7 is a graphic representation of measured RF transmission loss with frequency for a frequency selective surface according to the first embodiment of the presently disclosed invention.

FIG. 7 illustrates the RF transmission characteristics of an embodiment of an FSS area in accordance with the presently disclosed invention having an FSS pattern similar to that shown and described in connection with FIGS. 3 and 3A. The FSS area had the same length and height of 279.4 mm (11" by 11" square). Dimension a was 6 mm; horizontal slot length b was 12 mm; vertical channel spacing d and horizontal slot spacing c was 1 mm; and the slot width e was 0.1 mm. FIG. 7 shows that this design offers very good performance for horizontally polarized signals in the 3.5 GHz to 11.5 GHz. Also there are nulls at 2 GHz and 12 GHz, respectively. In accordance with the presently disclosed invention, the frequency at which the null occurs can be shifted by varying the dimensions a and b.

Figure 8:
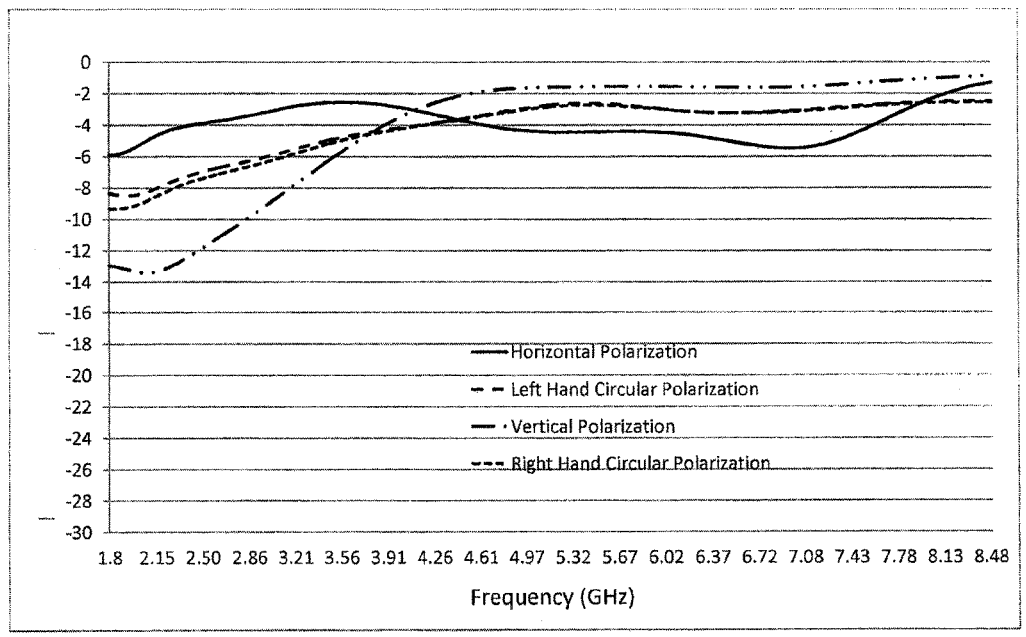
FIG. 8 is a graphic representation of measured RF transmission loss with frequency for a frequency selective surface according to the second embodiment of the presently disclosed invention.

FIG. 8 is a graph of the test results for an embodiment of the presently disclosed invention that is similar to the FSS pattern that is shown and described in connection with FIGS. 4 and 4A. In this example, the aperture had the same length and height of 279.4 mm (11" by 11" square). Dimension f was 6 mm; horizontal slot length g was 12 mm; dimension d was 1 mm; vertical slot length h was 24 mm; spacing d between adjacent vertical slots was 1 mm; spacing i was 4 mm; and slot width e for both horizontal and vertical slots was 0.1 mm. As shown and described in connection with FIG. 8, this embodiment provides improved transmission for vertical polarization in the 4 GHz to 8.5 GHz frequency band. The RF transmission characteristic of this embodiment shows that it's a high pass filter with cutoff frequency around 3.8 GHz. Overall, the transmission characteristics are good in the pass band for RF signals at all of the polarizations including horizontal, vertical, right hand circular and left hand circular polarizations.

Figure 9:
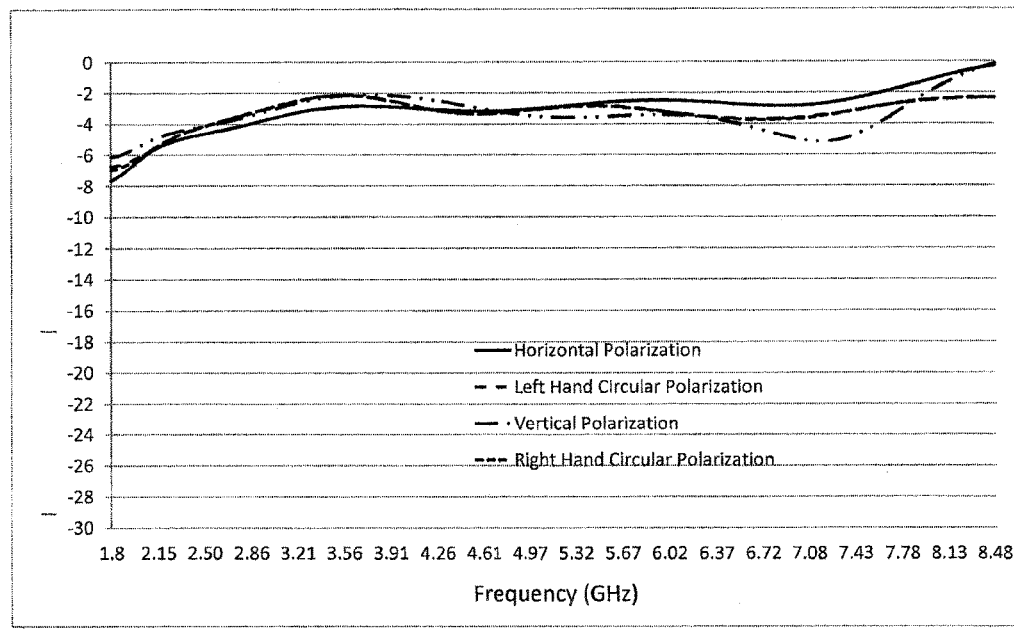
FIG. 9 is a graphic representation of measured RF transmission loss with frequency for a frequency selective surface according to the third embodiment of the presently disclosed invention.

FIG. 9 shows the test results for an embodiment similar to the FSS pattern of FIG. 5. The aperture has an FSS area structure similar to that of FIG. 4 except that groups of vertical channels were included between elements of the patch arrays and the length k of horizontal slots was increased to 24 mm from 12 mm for the previous example. The channel spacing d for adjacent members of the groups of vertical channels was 1 mm. All other dimensions remained the same as for the sample constructed in accordance with the pattern of FIG. 4. The vertical channels were added to improve transmission performance for horizontally polarized signals and the increased length of horizontal slots was to improve the RF transmission of vertically polarized signals over a lower frequency band. As shown in FIG. 9, this embodiment provides improved transmission performance for vertically polarized signals in the 1.8 GHz to 4.0 GHz frequency band. The RF transmission characteristic of this embodiment shows that the filter provides flat response to signals at all of the polarizations over a wide frequency band above 2.4 GHz. That frequency band includes signals for electronic toll collection (ETC) systems that typically operate at 2.5 GHz and 5.8 GHz.

Figure 10:
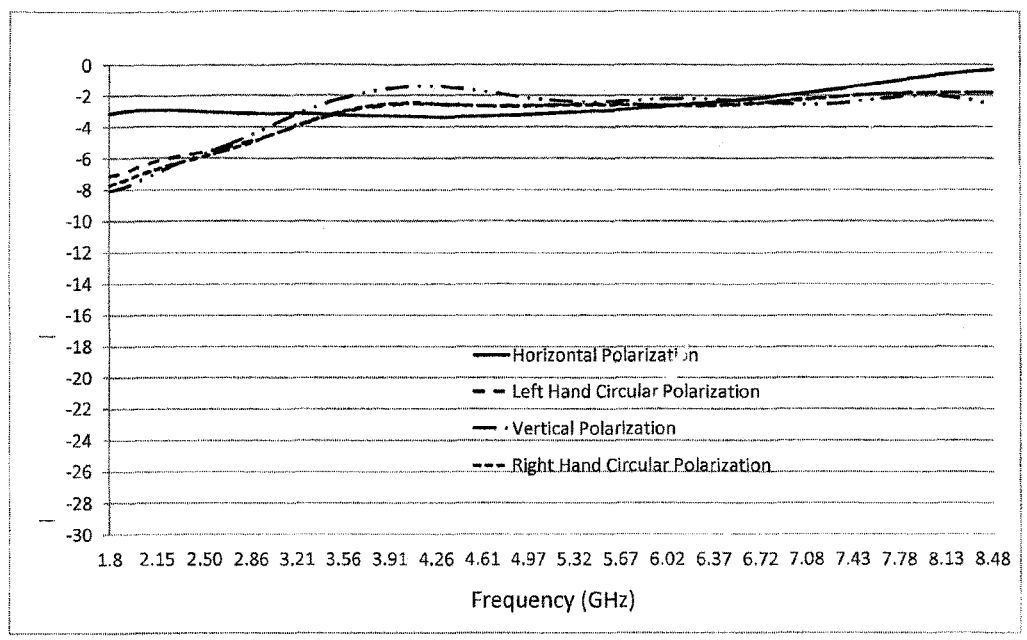
FIG. 10 is a graphic representation of measured RF transmission loss with frequency for a frequency selective surface according to a further embodiment of the presently disclosed invention.

FIG. 10 shows the test results for an embodiment similar to the FSS pattern illustrated in FIG. 6. In this example, the aperture had the same length and height of 279.4 mm (11" by 11" square). Dimension y was 6 mm; horizontal slot length x was 18 mm; spacing d for adjacent horizontal slots was 1 mm; spacing d for adjacent vertical slots was 1 mm; and slot width e for both horizontal and vertical slots was 0.1 mm. As shown in FIG. 10, this embodiment provides an improvement in the transmission performance for vertically and circularly polarized signals in the 4 GHz to 8.5 GHz frequency band. The filter also provides a flat response to horizontally polarized signals across the frequency band from 1.8 GHz to 8.5 GHz.

While the invention has been described and illustrated by reference to certain preferred embodiments and implementations, it should be understood that various modifications may be adopted without departing from the spirit of the invention or the scope of the following claims.

What is claimed is:

1. A heatable window comprising:
   a transparent substrate sheet having at least one major surface;
   a coating on said surface of said substrate sheet, said coating being responsive to electrical voltage to heat said window, an area of said coating defining at least two linear arrays of elements wherein each of said elements includes a first set of slots that are parallel to each other and a second set of slots that are parallel to each other with the slots in said first set being oriented orthogonally to the slots of said second set, each of said slots being a strip of predetermined width and predetermined length that is void of said coating, said at least two elements, in combination with the coating adjacent and between the slots thereof, defining a frequency selective surface wherein the elements of said frequency selective surface are aligned in at least one linear array with a portion of the coating separating adjacent elements of said array, and wherein the adjacent elements of said at least one linear array of elements are separated by a group of two or more channels, each of said channels having a length that corresponds to the length of at least one of said linear arrays of elements, each of said chambers also having a predetermined width and being parallel to each other and also parallel to the slots of one of said first set of slots of said elements or said second set of slots of said elements, said frequency selective surface passing signals within at least one predetermined frequency range and also providing thermal heating to at least a portion of said transparent substrate that defines said frequency selective surface, said frequency selective surface mitigating thermal extremes in areas of said sheet that are adjacent to said frequency selective surface.

2. The heatable window of claim 1 wherein each of the channels of each said group are oriented in a direction that is parallel to the slots of said first set of slots in each element, said channels being spaced apart from each other by a predetermined, constant dimension.

3. The heatable window of claim 1 wherein each of the channels of each said group are oriented in a direction that is parallel to the slots of said second set of slots in each element, said channels being spaced apart from each other by a predetermined constant dimension.

4. A coated window having a frequency selective surface, said window comprising:
   a transparent substrate sheet that defines a major surface;
   an electrically conductive coating that covers a major surface of said substrate sheet;
   two or more spaced bus bars that are in electrical contact with said coating;
   a first lead that contacts at least one of the bus bars and a second lead that contacts at least a second of said bus bar to provide electrical connections to the bus bars; and
   an area of said coating that defines a frequency selective surface that passes signals within at least one predetermined frequency band, said frequency selective surface including:
   at least two groups of channels, each channel being approximately parallel to the other channels in the same group and to channels in other groups, each of said channels having a predetermined width and a length that corresponds to one dimension of the frequency selective surface, each group of at least two groups of channels being spaced apart from each other in a direction that is orthogonal to said channels by a predetermined dimension; and
   at least two sets of slots, the slots in each set defining a square-wave pattern, at least one square-wave pattern of said slots being situated between two groups of channels, each square-wave pattern having a predetermined width and a length that corresponds to the length of said channels, said groups of channels and said square-wave patterns combining to form a repeating pattern of channels, square-wave pattern, and channels to define said frequency selective surface.

5. The window as claimed in claim 4 wherein said slots in the channels in said groups and slots in said square-wave pattern that are parallel to the channels in said groups facilitate the passage of horizontally polarized signals through said frequency selective surface.

6. The window as claimed in claim 4 wherein said slots in said square-wave pattern that are orthogonal to the channels in said groups facilitate the passage of vertically polarized signals through said frequency selective surface.

7. The window as claimed in claim 4 wherein said square-wave pattern includes slots that have a length corresponding to at least one-half the wavelength of the lowest passing signal frequency.

8. The window as claimed in claim 4 wherein said frequency selective surface passes horizontally polarized RF signals from 3.5 GHz to 11.5 GHz with low loss.

9. The window as claimed in claim 4 wherein said electrically conductive coating is adapted to conduct electricity and wherein said frequency selective surface is oriented such that electric current flows between said channels of said group of channels from the first bus bar to the second bus bar.

* * * * *